(12) United States Patent
Han et al.

(10) Patent No.: US 6,778,173 B2
(45) Date of Patent: Aug. 17, 2004

(54) HIERARCHICAL IMAGE-BASED REPRESENTATION OF STILL AND ANIMATED THREE-DIMENSIONAL OBJECT, METHOD AND APPARATUS FOR USING THIS REPRESENTATION FOR THE OBJECT RENDERING

(75) Inventors: Mahn-jin Han, Kyungki-do (KR); Alexander Olegovich Zhirkov, Moscow (RU)

(73) Assignee: Samsung Electronics Co., Ltd., Suwon-si (KR)

(*) Notice: Subject to any disclaimer, the term of this patent is extended or adjusted under 35 U.S.C. 154(b) by 182 days.

(21) Appl. No.: 10/173,434

(22) Filed: Jun. 18, 2002

(65) Prior Publication Data

US 2003/0052878 A1 Mar. 20, 2003

(30) Foreign Application Priority Data

Jun. 29, 2001 (RU) .......................................... 2001118222

(51) Int. Cl.⁷ ................................................ G06T 17/00
(52) U.S. Cl. ....................................................... 345/420
(58) Field of Search ................................. 345/420, 427

(56) References Cited

PUBLICATIONS

US 2003/0038798 A1. Method and System for Processing, Compressing, Streaming, and Interactive Rendering of 3D Color Image Data. Besl et al. Pub. Feb. 27, 2003.*
Manuel M. Oliveira et al., "Relief Texture Mapping", Proceedings of SIGGRAPH 00, 10 pp.
Jonathan Shade et al., "Layered Depth Images", Proceedings of SIGGRAPH 1998, pp. 231–242.
Chun–Fa Chang et al., "LDI Tree: A Hierarchical Representation for Image–Based Rendering", Proceedings of SIGGRAPH 1999, pp. 291–298.
Szymon Rusinkiewicz et al., "QSplat: A Multiresolution Point Rendering System for Large Meshes", Proceedings of SIGGRAPH 2000, pp. 1–10.
Hanspeter Pfister et al., "Surfels: Surface Elements as Rendering Primitives", Proceedings of SIGGRAPH 2000, 8 pp.

(List continued on next page.)

*Primary Examiner*—Mark Zimmerman
*Assistant Examiner*—Peter-Anthony Pappas
(74) *Attorney, Agent, or Firm*—Burns, Doane, Swecker & Mathis, L.L.P.

(57) ABSTRACT

Provided is a method and apparatus for representation and rendering of three-dimensional still and animated objects, using Binary Volumetric Octree. The three-dimensional object representation based on depth images, requiring relatively small storage space and allowing for fast and high quality rendering. Original data of a three-dimensional object are converted into Binary Volumetric Octree (BVO) format, where color is attributed to each BVO vertex corresponding to coordinates of points belonging to object surface, said color being the average of colors of object surface points whose coordinates are inside a cube representing a three-dimensional image element, voxel; the BVO is rendered by hierarchical traversal of the octree from root vertex to leaves so that to obtain local three-dimensional coordinates of centers of voxels corresponding to BVO leaves, to transform the obtained three-dimensional coordinates into two-dimensional coordinates of the voxel center and information of size of the projected voxel image, and to generate for each BVO leaf and display a corresponding splat covering area of the projected voxel image and using color information, the three-dimensional object being visualized by a plurality of the displayed splats.

20 Claims, 6 Drawing Sheets

OTHER PUBLICATIONS

Bradford Chamberlain et al., "Fast Rendering of Complex Environments Using a Spatial Hierarchy", Proceedings of Graphics Interface 1996, 9 pp.

J. P. Grossman, "Point Sample Rendering", Proceedings of Eurographics Workshops on Rendering Techniques 1998, pp. 1–57.

Dani Lischinski et al., "Image–Based Rendering for Non-Diffuse Synthetic Scenes", Proceedings of Eurographics Workshops on Rendering Techniques 1998, 14 pp.

M. Levoy et al., "The Use of Points as Display Primitive", Technical Report TR 85–022, The University of North Carolina at Chapel Hill, Department of Computer Science, 1985, pp. 1–19.

L. Westover, "Footprint Evaluation for Volume Rendering", Proceedings of SIGGRAPH 1990, pp. 367–376.

C. I. Connolly, "Cumulative Generation of Octree Models from Range Data", Proceedings of Intl. Conf. Robotics, pp. 25–32, Mar. 1984.

G.H Tarbox et al., "IVIS: An Integrated Volumetric Inspection System", Proceedings of the 1994 Second CAD–Based Vision Workshop, pp. 220–227, Feb. 1994.

B. Curless et al., "A Volumetric Method for Building Complex Models from Range Images", Proceedings of SIGGRAPH 1996, pp. 1–10.

C. Bregler, "Video Based Animation Techniques for Human Motion", SIGGRAPH '00 Course 39: Image–based Modeling and Rendering, pp. 7–1 to 7–3.

Paul F. Debevec et al., "Modeling and Rendering Architecture from Photographs: A Hybrid Geometry–and Image-based Approach", Proceedings of SIGGRAPH 1996, pp. 1–33.

* cited by examiner

HIERARCHICAL IMAGE-BASED REPRESENTATION OF STILL AND ANIMATED THREE-DIMENSIONAL OBJECT, METHOD AND APPARATUS FOR USING THIS REPRESENTATION FOR THE OBJECT RENDERING

Priority is claimed to Patent Application Number 2001118222 filed in Russia on Jun. 29, 2001, herein incorporated by reference.

BACKGROUND OF THE INVENTION

1. Field of the Invention

The present invention relates to computer graphics and more specifically to a three-dimensional still and animated object representation obtained from photos of real objects and their geometrical representations, and to a method and apparatus for representation and rendering, using Binary Volumetric Octree.

2. Description of the Related Art

In the immediate future, high-quality rendering of three-dimensional (3D) objects at interactive speed will receive the primary emphasis in modern graphic systems. The demand for high-quality rendering of 3D objects necessitates effective algorithms to be devised for compression of the objects and transmitting them via communications networks in such fields as electronic commerce, computer games, science, engineering, medicine. Use of traditional polygonal models of 3D objects during the last tens of years to simultaneously meet all these demands has failed to give the desired result. Polygonal models have two major shortcomings: large volume (e.g., realistic models require tens of million triangles) and difficulty of constructing.

To overcome these difficulties, several approaches to 3D graphics were suggested in recent years. The most advantageous of them seem to be methods based on using images of objects, and methods based on using points instead of triangles in 3D space.

Image-based methods represent the given object as a set of images—'photos' of the object—totally covering its visible surface, and taken from several different camera positions. Besides, each such image is accompanied with corresponding depth-map which is an array of distances from the pixels in the image plane to the object surface. An advantage of such a representation is that reference images can provide high quality of the object visualization regardless of its polygonal model complexity, and can be compressed by usual image compression techniques without sacrificing much quality. In addition, rendering time is proportional to the number of pixels in the reference and output images and not the object complexity.

Disadvantages are due to the fact that obtaining depth maps for real life objects (e.g., sculptures) is rather complicated operation, as well as to insufficiently developed techniques of handling such representations.

Point-based methods represent an object as a 'cloud of points' without imposing explicit local polygonal structure. In this method, a set of images with a depth defines a set of points (having corresponding colors) on the object surface by translating each pixel of each reference image by the corresponding depth value in the direction orthogonal to the image plane. Hence image-based representations are a particular case of point-based representations. In the following we shall concentrate on image-based representations as they are closer to our approach.

In literature, the two aforementioned trends are described in references [1] to [13] describing such 3D object representation and rendering methods, as Relief Textures Mapping [1], Layered Depth Images [2], Layered Depth Image Tree [3], Qsplat [4], Surfels [5] and some other that have been known in prior art. In the following discussion of the prior art approaches, references will be made to the following publications:

[1] Manuel M. Oliveira, Gary Bishop, David McAllister. Relief Textures Mapping, Proceedings of SIGGRAPH '00;

[2] Jonathan Shade, Steven Gortler, Li-wei He, Richard Szeliski, Layered Depth Images, Proceedings of SIGGRAPH '98;

[3] Chun-Fa Chang, Gary Bishop, Anselmo Lastra. LDI Tree: A Hierarchical Representation for Image-Based Rendering, Proceedings of SIGGRAPH '99;

[4] Szymon Rusinkiewicz, Marc Levoy. QSplat: A Multiresolution Point Rendering System for Large Meshes, Proceedings of SIGGRAPH '00;

[5] Hanspeter Pfister, Matthias Zwicker, Jeroen van Baar, Markus Gross. Surfels: Surface Elements as Rendering Primitives, Proceedings of SIGGRAPH '00;

[6] Chamberlain et al., Fast Rendering of Complex Environments Using a Spatial Hierarchy, Proceedings of Graphics Interface '96;

[7] Grossman and Dally, Point sample rendering, Proceedings of Eurographics Workshops on Rendering Techniques '98;

[8] Lischinski and Rappoport, Image-Based Rendering for Non-Diffuse Synthetic Scenes, Proceedings of Eurographics Workshops on Rendering Techinques '98;

[9] M. Levoy and T. Whitted, The Use of Points as Display Primitives. Technical Report TR 85-022, The University of North Carolina at Chapel Hill, Department of Computer Science, 1985;

[10] L. Westover, Footprint Evaluation for Volume Rendering, Proceedings of SIGGRAPH '90;

[11] C. I. Connolly. Cumulative Generation of Octree Models from Range Data, Proceedings of Intl. Conf. Robotics, pp. 25–32, March 1984;

[12] G. H Tarbox and S. N. Gottschlich. IVIS: An Integrated Volumetric Inspection System, Proceedings of the 1994 Second CAD-Based Vision Workshop, pp. 220–227, February 1994;

[13] Curless, B., Levoy, M., A Volumetric Method for Building Complex Models from Range Images, Proceedings of SIGGRAPH '96;

[14] C. Bregler, Video Based Animation Techniques for Human Motion, SIGGRAPH '00 Course 39: Image-based Modeling and Rendering; and

[15] Paul F. Debevec, Camillo J. Taylor, Jitendra Malik, Modeling and Rendering Architecture from Photographs: A Hybrid Geometry-and Image-based Approach, Proceedings of SIGGRAPH '96.

The common problem with image-based methods is occurrence of holes in the resulting image. Unlike polygonal models that are 'continuous' in the sense that the object surface is linearly interpolated into the interior of all the polygons (normally, triangles), image-based and point-based representations provide 'discrete' approximations of the object. In case of image-based representations, the object surface is, in fact, approximated with small colored squares, i.e. shifted pixels of reference images. When viewing direction differs substantially from the normal direction to each of the reference image planes, projections of the approximating squares generally do not completely cover the projection of the object surface. Let as call such holes the holes of the first type. Another source of holes in the resulting image for image-based representations is the fact that some parts of the surface may be not visible in all of the reference images, but become visible for some viewpoints (holes of the second type). These holes are due to insufficient information contained in a particular image-based representation.

Relief texture method [1] suppresses holes of the first type by using an analog of linear interpolation, which may lead to distortions and artifacts, since interpolation is performed in the two-dimensional (2D) projection of the object rather than in 3D space. More importantly, holes of the second type can only be treated the same way under this approach. Since the method of [1] uses only 6 reference images, that is, projections of the object on the circumscribing cube faces, this imposes serious restrictions on this method application to complex shapes when there exist points invisible from all six cube faces. This approach was chosen to maximize rendering speed, namely by using fast prewarping (geometric transformation equivalent to the change of viewing direction under the orthographic projection), but it leads to quality degradation.

Layered depth images (LDI) [2] are data structure designed to avoid the problem with holes of the second type. LDI is an image whose pixels contain all the object points projecting to a fixed location in the reference image plane. Fast prewarping algorithm of [1] applies here as well. However, problems with holes of the first type remain. Splatting (first introduced in [10]) is used to solve the problem of holes of the first type. Splat is a small two-dimensional rectilinear or elliptical surface patch, endowed with a certain color distribution—e.g. Gaussian, centered at the center of the patch, or constant. Disadvantage of the LDI method is in its nonsymmetry since the representation is based on a projection in a certain fixed direction. This leads to difficulties with hole filling for viewing directions greatly different from said fixed direction.

LDI tree [3] is an octree with an LDI attached to each octree cell (node). The advantage of having a hierarchical model is that not every LDI in the octree should be rendered. Those cells that are farther away are rendered in less detail by using the filtered points that are stored in the LDIs higher in the hierarchy. This representation was devised in order to overcome the nonsymmetry of LDI by using many reference images. However, the storage amount becomes very large: LDI tree for 512-by-512 image (obtained from 36 reference images) occupies 30 Mbytes as reported in [3], and about half this amount was the tree structure itself. As reported in [3], rendering time for this object is also large: 2–3 seconds per frame on Silicon Graphics Onyx2 with 32250 MHz MIPS R10000 processors (without using parallelism).

Yet another representation combining image-based data into a tree structure is recently designed Surfels method [5]. It deals with a specific tree [8] that is a layered-depth cube (LDC) where instead of single LDI tree nodes contain three LDI's corresponding to three orthogonal planes. Results reported in [5] were obtained for original model containing 81000 triangles. Frame rate of 11 frames per second (fps) for 256-by-256 output buffer was obtained on Pentium III 700 MHz processor. Surfels are reference image pixels shifted by a corresponding depth vector. Tree structure is used to speed up computations for choosing visible elements. Hole filling is achieved by nearest-neighbor or Gaussian filtering. Splatting is implemented in this structure. High quality of the resulting image is attained at the cost of data content and speed restrictions.

Recently introduced representation of Qsplat [4] should also be mentioned, although it is rather point-based than image-based method. This approach uses hierarchical point structure based on nested balls. Elliptical splats of proper size are used at the rendering stage. However somewhat complicated and time-consuming truncated culling was used in [4]. The data structure is also more complex, and requires more time to process.

The idea and various implementation methods for obtaining octree structured 3D model from range data such as sets of depth images were developed in [1]–[12]. [13] deals with a construction of polygonal model from original data using octree. All the above relates to still 3D image-based representations. Speaking of animated 3D objects, it should be noted that only very few image-based methods were suggested for this problem so far. In [14] an idea of facial image modification for almost constant 3D face geometry is developed. This is applicable only to a restricted class of animated objects and is not animation of an actual 3D object. In [15] architectural scenes are animated with the aid of view-dependent texture mapping which reconstructs architectural views from various viewpoints on the base of a few photos.

Therefore, it is clear that an image-based representation allowing compact storage, fast rendering with high output image quality, and suitable for animation purposes is needed.

SUMMARY OF THE INVENTION

It is an object of invention to provide a three-dimensional object representation based on depth images, requiring relatively small storage space and allowing for fast and high quality rendering, in which the drawbacks of the discussed prior arts are reduced or eliminated.

It is a particular object of the invention to provide a method and apparatus for 3D object representation and rendering, allowing for fast computing of coordinate transformation, automatic determination of an order of imposing elements of Binary Volumetric Octree (BVO), and formation of splats of accurately defined size.

It is still further object of the invention to provide a method for compact representation of an animated 3D object, allowing for fast and correct rendering.

Compact data stream representation is effected by separating geometric and color components of the BVO and using binary representation of the octree for compression of the geometric component, and 2D image compression algorithms for compression of the color component.

The above result is achieved in a method for representation and rendering of a three-dimensional (3D) object in accordance with the invention, comprising the steps of: converting original data of a three-dimensional object into Binary Volumetric Octree (BVO) format, where color is attributed to each BVO vertex corresponding to coordinates of points belonging to object surface, said color being the average of colors of object surface points whose coordinates are inside a cube representing a three-dimensional image element, voxel, corresponding to given BVO vertex; rendering the BVO by hierarchical traversal of the octree from root vertex to leaves, so that to obtain local 3D coordinates of centers of the voxels corresponding to BVO leaves, transforming the obtained 3D coordinates into 2D coordinates of the voxel center and information of size of the projected voxel image, and generating and displaying, for each BVO leaf, a corresponding splat covering area of the projected voxel image and using color information, the 3D object being visualized by a plurality of the displayed splats.

The original data of a 3D object is a set of depth images, or polygonal model data, or a set of colored points.

Furthermore, the hierarchical traversal of the octree is performed in order from BVO voxels farthermost from a viewer to closer BVO voxels.

To minimize computational complexity of the conversion process, before the traversal of the octree the method includes computing:

$$fT(i,\sigma i)=T2i-1\sigma i$$

where T is 4×4 matrix of coordinate type transformation, σi is any 4-dimensional vector whose elements are 0 or 1, i is an integer taking a value from 0 to the height value of the BVO analyzed, and using the obtained results in the hierarchical transformation of 3D coordinates into 2D coordinates, while computing Fi for each BVO vertex:

$$F_i = \sum_{j=i}^{n} f_T(i, \sigma^j) = f_T(i, \sigma^i) = F_{i+1} = F_i(\sigma^j, F_{i+1})$$

which gives, after traversal of the entire path from the BVO root vertex to leaves, for every BVO leaf specified by local coordinates (x,y,z):

$$Tv=F1(\sigma 1, F2(\sigma 2 \ldots Fn(\sigma n) \ldots ))$$

where σi is determined by the expression using binary record of coordinates:

$$v = \begin{pmatrix} x \\ y \\ z \\ 1 \end{pmatrix} = \begin{pmatrix} (\sigma_x^n \ldots \sigma_x^2 \sigma_x^1) \\ (\sigma_y^n \ldots \sigma_y^2 \sigma_y^1) \\ (\sigma_z^n \ldots \sigma_z^2 \sigma_z^1) \\ (0 \ldots 01) \end{pmatrix} = \sum_{i=1}^{n} 2^{i-1} \sigma^i$$

The above technical result is achieved by a three-dimensional (3D) object representation and rendering apparatus, comprising 3D object original data generation means for generating original data of 3D object; 3D object original data conversion means for converting the 3D object original data into Binary Volumetric Octree (BVO) format, said 3D object original data conversion means being connected to the 3D object original data generation means, where color is attributed to each BVO vertex corresponding to object point coordinates, said color being the average of colors of object points whose coordinates are inside a cube representing a three-dimensional image element, voxel, corresponding to said BVO vertex; and BVO rendering means connected to the 3D object original data conversion means.

The 3D object original data generation means is a three-dimensional real-life object scanner for outputting a plurality of 3D coordinates of points, or 3D object polygonal model generation means, or depth image generation means.

Furthermore, the above technical result is achieved in a method for representation of an animated three-dimensional (3D) object, comprising the steps of: converting original data of each 3D object in a sequence of 3D objects into Binary Volumetric Octree (BVO) format, where color is attributed to each BVO vertex corresponding to coordinates of points belonging to object surface, said color being the average of colors of the object surface points whose coordinates are inside a cube representing a three-dimensional image element, voxel, corresponding to said BVO vertex, so that to generate, for the sequence of 3D objects, a sequence of BVOs corresponding to the animated 3D object.

The method further comprises projecting each BVO in the sequence of BVOs onto faces of a cube corresponding to BVO root vertex, so that to obtain for each cube face a video stream corresponding to images of the animated object and generate an octree byte stream, each byte in the octree byte stream corresponding to an octree vertex, and each bit in byte indicating the presence or absence, respectively, of a subtree for said octree vertex, where six video streams and the octree byte stream form together representations of the animated 3D object, the six video streams being stored in compact form using MPEG video compression format, and the octree byte stream being stored using entropic compression.

Furthermore, the animated 3D object is visualized by projecting six reference image streams on BVO to determine color for each BVO vertex and project the obtained colored BVO for visualizing the animated 3D object.

BRIEF DESCRIPTION OF THE DRAWINGS

The present invention will become more readily apparent from the following detailed description of preferred embodiments when taken in conjunction with the accompanying drawings wherein.

DETAILED DESCRIPTION OF THE INVENTION

Figure 1:
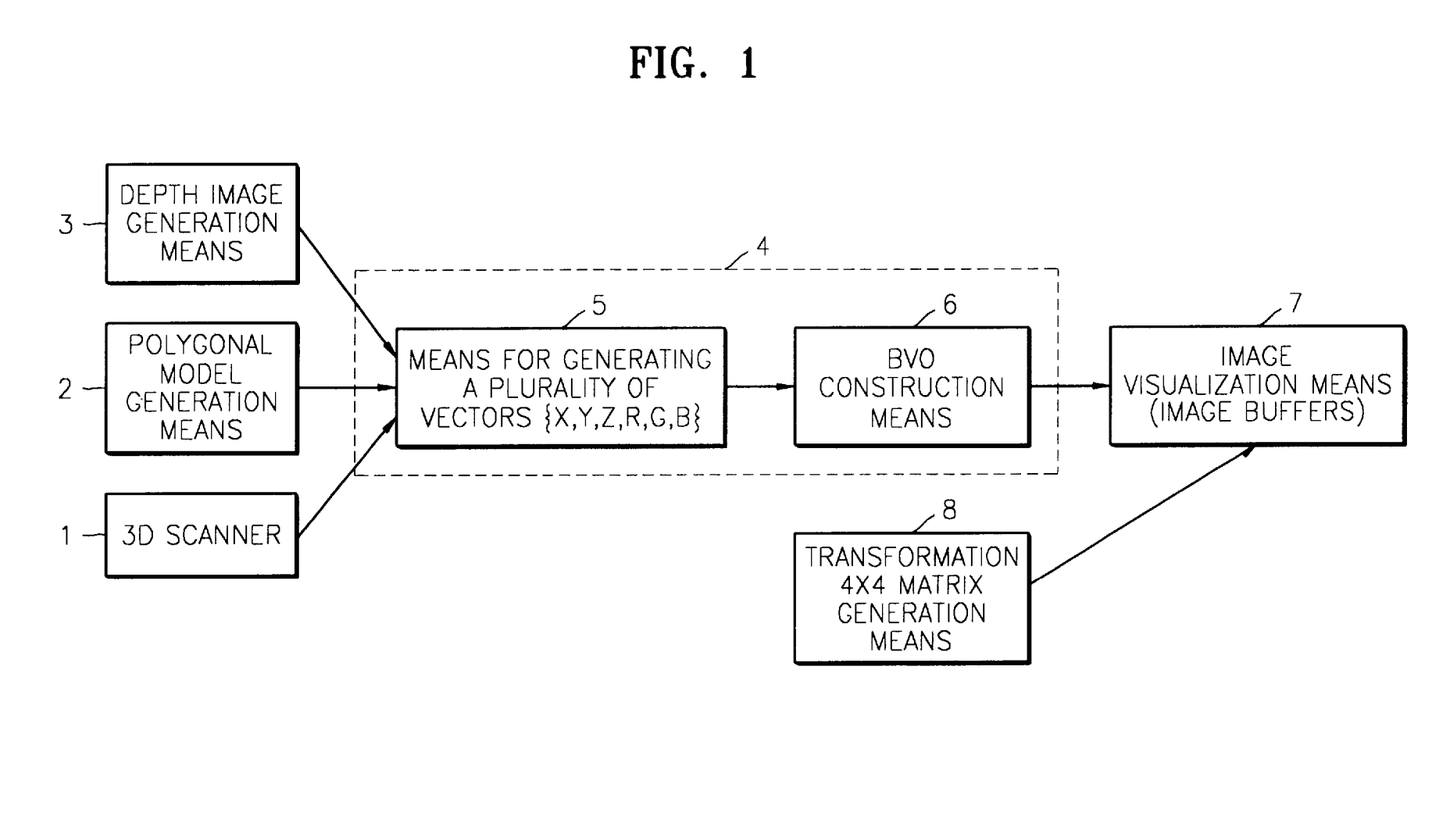
FIG. 1 is a functional schematic diagram of an apparatus for 3D object representation and rendering using various types of original data.

Referring now to FIG. 1, an apparatus for 3D object representation and rendering using original data of various types comprises 3D object original data generation means, such as a real-life 3D object scanner 1 for outputting a plurality of 3D coordinates of points, or polygonal model generation means 2, or depth image generation means 3, means 4 for converting the 3D object original data into BVO format, said conversion means comprising means 5 for generating a plurality of 6D vectors, including three coordinates x,y,z and three color coordinates, e.g. RGB, and BVO construction means 6. The BVO construction means 6 is connected to BVO visualization means 7 including an image buffer, and coordinate transformation matrix generation means 8.

Figure 2:
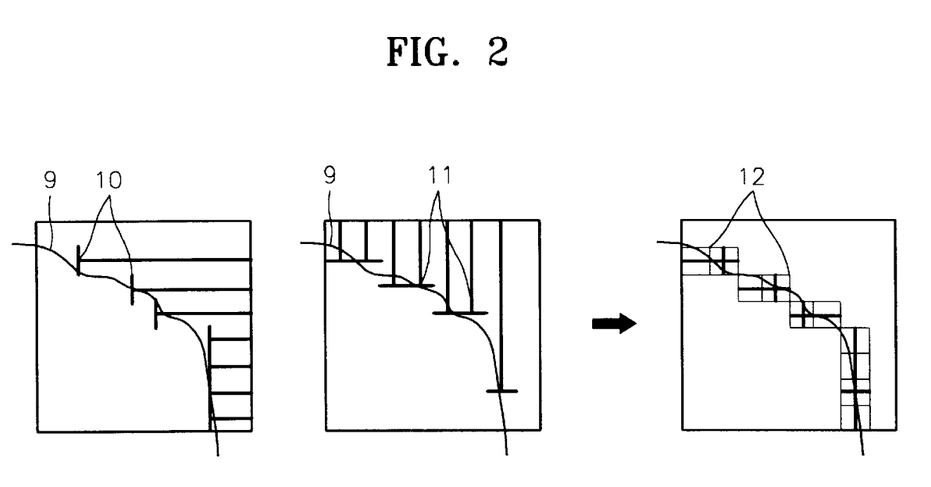
FIG. 2 demonstrates BVO generation from a pair of depth images obtained by orthographic cameras (2D view)

FIG. 2 shows how depth images are generated from a real surface and how they are combined to produce voxels in case of two orthographic cameras. Shown in FIG. 2 are: section 9 of a real object surface; projection 10 of rectangles approximating the surface of the real object photographed by a first camera (not shown), said projections corresponding to discrete values of depth image pixels; sampled depth values 11 of the surface 9 photographed by a second camera (not shown); voxels 12 corresponding to combined depth values of surfaces photographed by the two cameras.

Figure 3:
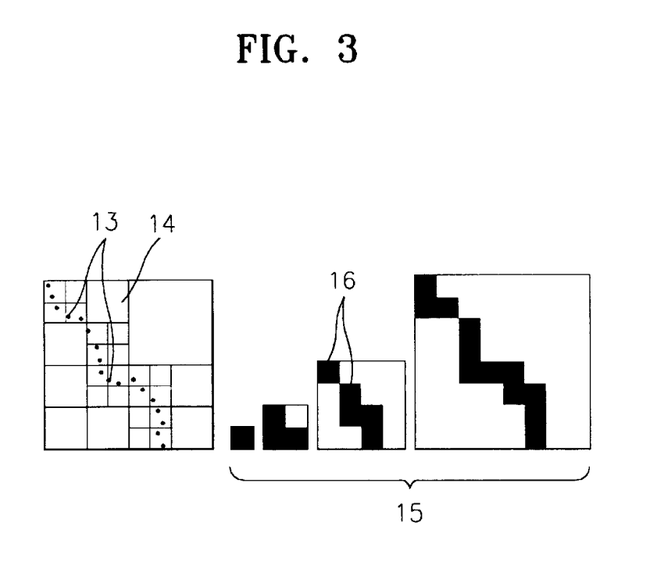
FIG. 3 represents the correspondence diagrams of 3D points and various BVO hierarchical levels (2D view)

FIG. 3 depicts the correspondence diagrams of 3D points and various scale levels of BVO (2D view). Shown in FIG. 3 are: plurality 13 of points with 3D coordinates; BVO structure 14 corresponding to points 13; scale levels 15 of BVO with marked voxels 16 containing color information and located at BVO nodes.

Figure 4:
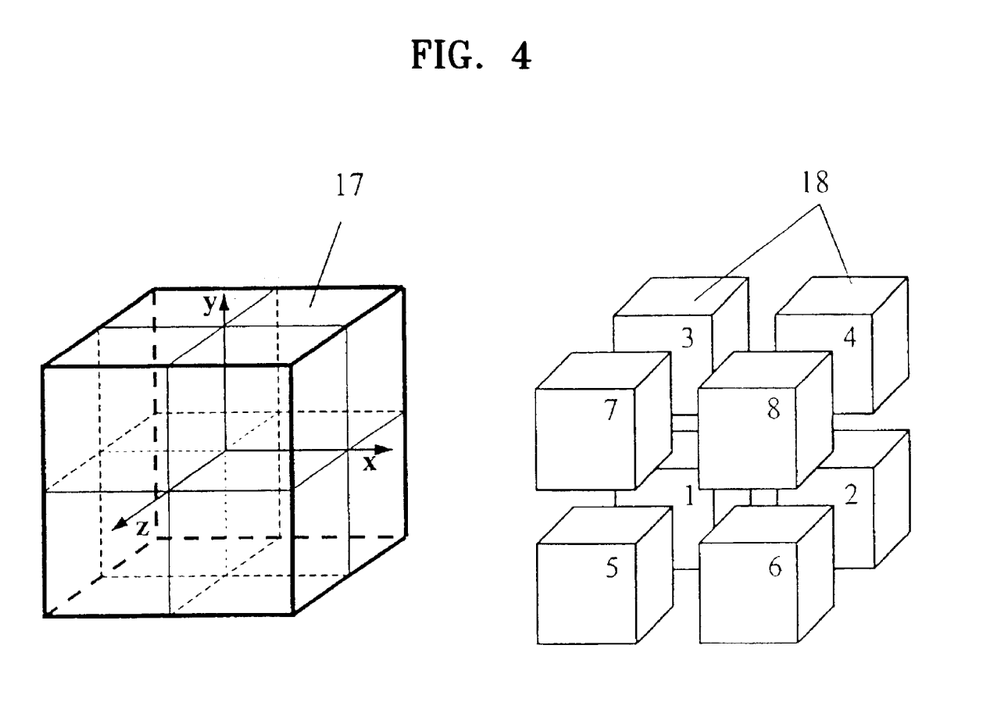
FIG. 4 illustrates BVO cube and its division into 8 subcubes.

FIG. 4 demonstrates BVO cube 17 and its division into eight sub-cubes 18.

Figure 5A:
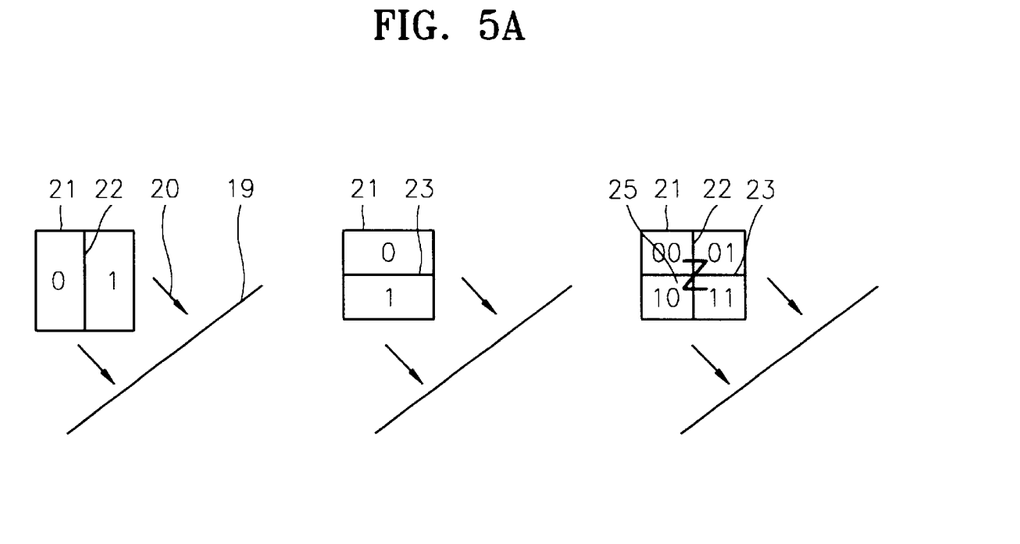
FIGS. 5a, b are 2D and 3D illustrations of determination of order of traversal of BVO vertices at a single hierarchical level.
Figure 5B:
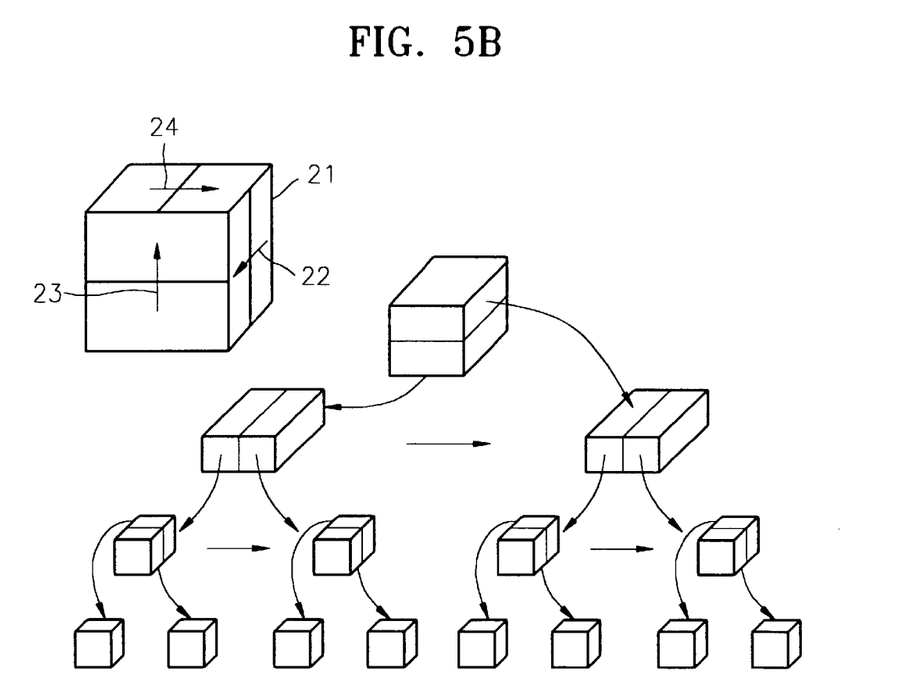

FIGS. 5a, b illustrates how an order of traversal of BVO vertices at single hierarchical level is determined. Shown in FIGS. 5a, b are: projection plane 19; projection direction 20; cube 21 corresponding to one of BVO vertices, divided by planes 22, 23, 24 parallel to faces of the cube 21; order 25 of traversal (projecting) each of the eight sub-cubes of the cube being analyzed.

Figure 6:
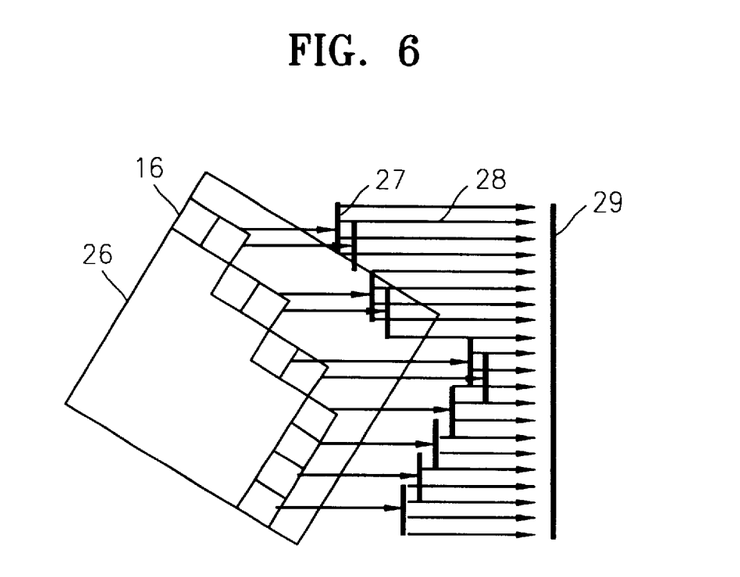
FIG. 6 illustrates the process of projecting splats in time and space, and geometrical conditions for splat size determination.

FIG. 6 illustrates how splats are projected in time and space, and geometrical conditions of splat size determination. Shown in FIG. 6 are: entire 8×8 BVO 26; voxel 16; splat 27; orthographic projection direction 28; image buffer 29.

Figure 7:
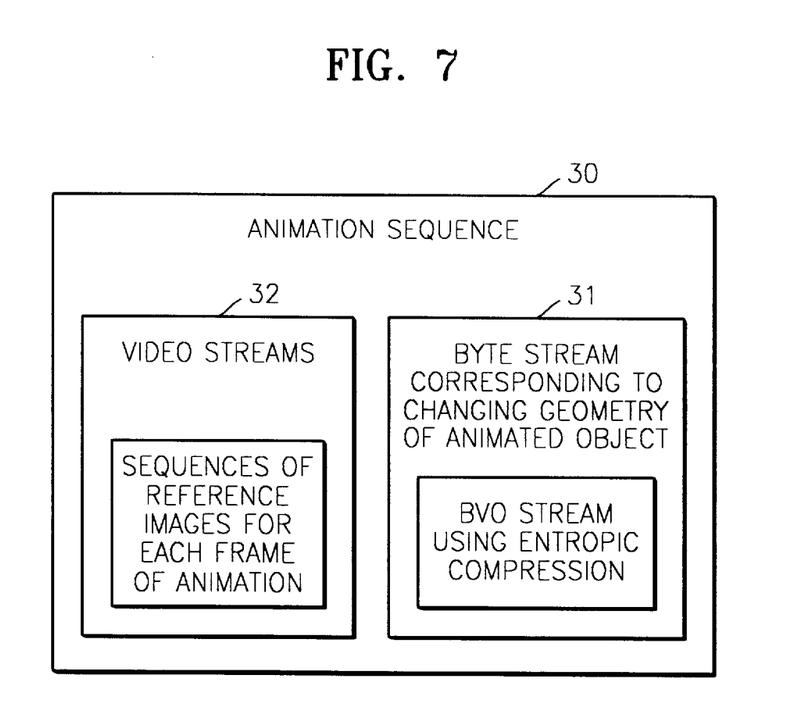
FIG. 7 shows a structure of the data stream representing an animated 3D object.

FIG. 7 shows a structure of BVO animation sequence 30 comprising a sequence 31 of BVO byte streams corresponding to changing geometry of the animated object, and video streams 32 (sequences of reference images for each animation frame).

Figure 8:
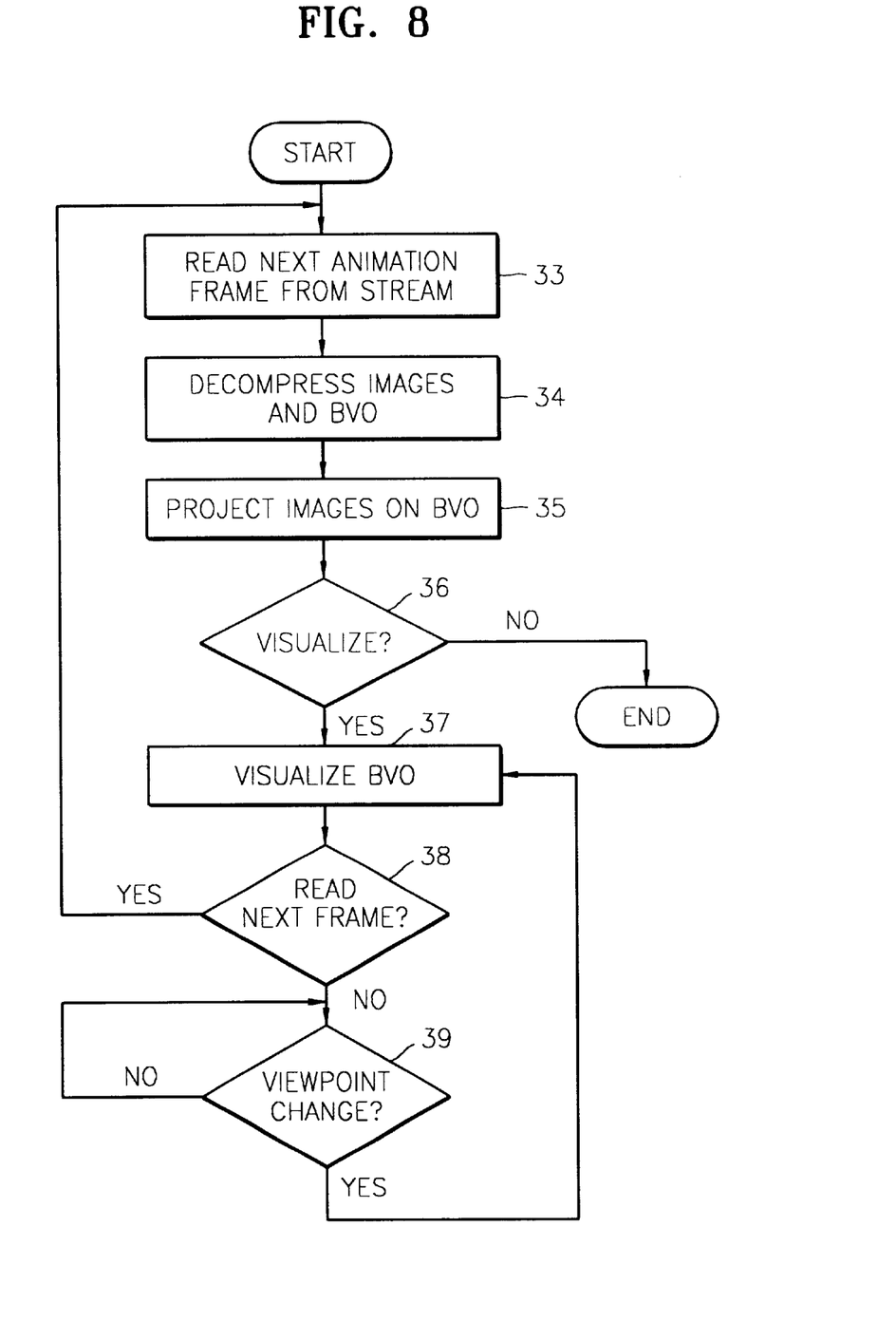
FIG. 8 is a flowchart of visualization process for an animated 3D object represented by data stream.

FIG. 8 illustrates steps 33–39 of a process for visualization of an animated 3D object represented by data stream.

A required 3D object representation, BVO, may be obtained from a majority of currently used 3D model representations. FIG. 1 shows conventional means for generating input representations, such as data of 3D scanner 1, polygonal models generated by means 2, sets of depth images generated by means 3. BVO application is mainly aimed at the use of sets of depth images as input representation. An advantage of the model representation by depth images is the possibility of generating 3D models directly from photos of real-life models, rather than by laborious modeling process.

To generate BVO, an input representation provided by any of the means 1, 2, 3 is converted into an intermediate representation with the aid of means 5 for generating a plurality of 6D vectors whose elements are three coordinates x,y,z and three color coordinates RGB. To construct BVO, its height n should be specified, then length of BVO cube edge in local BVO coordinates will be L=2n. Intermediate representation is constructed by the means 5 in the following manner.

For Polygonal Model:

Using transfer and scaling transformations, all vertices of the model polygons are made to be placed within a cube having a vertex at the origin of coordinates and the opposite vertex at the point with coordinates (L,L,L). By polygon subdivision methods, distance between any two neighboring vertices of any polygon is made no greater than 1. Color is attributed to each vertex of the polygon, using textures and texture coordinates of the original polygonal model.

For Depth Images:

Depth images are scaled and transferred so that, after recalculating to a common coordinate system for images, linear dimensions of the rectangle corresponding to a pixel will not exceed 1, and all the rectangles be placed within the space bounded by BVO cube. For recalculation to a common coordinate system, position information of the cameras with the aid of which the images have been obtained, and depth values corresponding to pixels in the image are used. This gives a plurality of points with color coordinates and coordinates common for all images. Color coordinates of a point correspond to the color of pixel in the original scaled image.

For Data of 3D Model Scanning:

Using transfer and scaling transformation, all points of the scanned model are made to be located within a space bounded by BVO cube having a vertex at the origin of coordinates, and the opposite vertex at the point with coordinates (L,L,L). Upon obtaining the intermediate representation in the form of a plurality of points $\{x,y,z,G,G,B\}$ where coordinates x,y,z are enclosed in the BVO cube, the means 6 constructs BVO illustrated in FIG. 3. Cube 17 is hierarchically divided into eight sub-cubes 18 (FIG. 4) corresponding to vertices which are on the next hierarchical level after the root vertex, thereby obtaining BVO of the first scale level. The BVO can be considered as a sequence of scale levels 15 (FIG. 3) of BVO with increasing height, where the use of trees having a smaller height does not necessitate processing the trees having a greater height for all algorithms listed below. For the processing which follows, BVO sub-trees are stored if and only if the cube corresponding to given sub-tree comprises at least one point 13. BVO structure 14 is obtained from a plurality of points 13. Color is attributed to each BVO vertex (not only to the end one). The color attributed to a vertex is the average of colors of points belonging to the cube corresponding to this vertex.

The BVO rendering means 7 uses 3D coordinate system transformation specified by means 8 for generating coordinate type transformation 4×4 matrix T. Coordinates resulting from the type transformation specify the viewpoint location relative to the BVO.

To be rendered, the BVO should be traversed through all its vertices from root vertex to leaves of the tree. While traversing the leaves, a special pattern, referred to as splat, is stored in an image buffer 29. As shown in FIG. 6, a splat 27 of the vertex being analyzed should cover the space of the projected cube 26 corresponding to the analyzed vertex. Color of the splat should correspond to the color of the analyzed BVO vertex. Shape of the splat is chosen so that to enable fast storage in the image buffer, and is generally square or circle. Coordinates of the splat 27 center should correspond to coordinates of the center of the projected cube 26 corresponding to this vertex.

To provide correct BVO rendering which takes into account cube positions relative to the viewpoint, care must be taken in the rendering process that at each point of the image buffer the splats projected the last were located closer to the viewer than the other splats projected earlier on the analyzed point in the image buffer. BVO rendering speed depends essentially on speed of coordinate type transformation of the points corresponding to cube centers. With a hardware graphic accelerator, the aforementioned problems can be solved using a hardware z-buffer to provide correct rendering, and hardware-assisted acceleration of matrix multiplication in computation of transformations of cube center points.

The BVO rendering method that does not employ special graphic accelerators involves a method of determining a correct order of BVO traversal and a method of fast hierarchical coordinate type transformation of cube center coordinates. The use of BVO traversal order in accordance with the invention ensures correct projection of splats without resorting to z-buffer.

A method for determining order of BVO traversal, which enables correct projection of splats, is based on determining, at each BVO vertex, an order of traversal of sub-trees whose root vertices originate from this vertex. As shown in FIG. 5, to determine an order of traversal of vertices of the cube 21 corresponding to the analyzed BVO vertex, the cube 21 is divided by a plane into two equal parallelepipeds using all of the three available methods. In FIGS. 5a, b, the planes are depicted by lines 22, 23, 24 Correct projection order is determined for each section, this may be done by determining the direction of angle between the normal to the common face of parallelepiped 22 (23) and the projection direction 19. Upon performing this operation, order of traversal 25 of each of eight sub-cubes of the analyzed cube 21 is obtained in each of the three cases.

The above process of determining order of cube projection is performed recursively, according to the following description of the overall rendering process which includes determination of BVO traversal order and fast hierarchical transformation:

a. Perform preprocessing at each change of the viewpoint.

b. Make the root vertex current.

c. Determine correct order of projecting all the eight sub-cubes corresponding to the current vertex. For orthographic projection, all the nodes inherit this order from the cube sub-division of the corresponding root vertex.

d. For all the sub-cubes of the current vertex do:

1) Compute transformations of cube center coordinates, required for this vertex.

2) If current vertex is leaf of the tree, project splat as described above (FIG. 6).

3) If current vertex is not leaf of the tree, make the vertex corresponding to this sub-cube current and recursively go to (b).

Operations of steps (a) and (d(1) are accomplished in the following manner. Denote 4×4 transformation matrix T. The transformation describes a linear transform in 4-dimensional space. Let n be BVO height, v—local normal coordinates of a voxel. Assume that voxel coordinates are stored in a standard implicit binary form (standard binary record of BVO format with each byte corresponding to an internal octree vertex (including root vertex), and each bit in byte indicating the presence or absence, respectively, of a sub-tree for this octree vertex), and rewrite node coordinates as (1):

$$v = \begin{pmatrix} x \\ y \\ z \\ 1 \end{pmatrix} = \begin{pmatrix} (\sigma_x^n \ldots \sigma_x^2 \sigma_x^1) \\ (\sigma_y^n \ldots \sigma_y^2 \sigma_y^1) \\ (\sigma_z^n \ldots \sigma_z^2 \sigma_z^1) \\ (0 \ldots 01) \end{pmatrix} = \sum_{i=1}^{n} 2^{i-1} \sigma^i \quad (1)$$

Then the desired transformation of vertex coordinate has the form $$T_v = \sum_{i=1}^{n} T 2^{i-1} \sigma^i \quad (2)$$

Here σi(x,y,z) are components of binary form of coordinates of the corresponding vertex (i.e. coordinates of the cube center), σi is vector of these coordinate components for fixed number of component i. At each BVO vertex, Fi is computed as $$F_i = \sum_{j=i}^{n} f_T(i, \sigma^j) = f_T(i, \sigma^j) = F_{i+1} = F_i(\sigma^j, F_{i+1}) \quad (3)$$

For fixed T, terms of expression (3) are computed at pre-processing step (a):

$$fT(i, \sigma i) = T2i - 1\sigma i \quad (4)$$

These expressions are stored in n-by-8 table, and transformation is then computed by the formula (3) for all vertices using only table look-up and summation. As the result, after passing the entire path from the root vertex to BVO leaves, for each BVO leaf specified by local coordinates (x,y,z) obtain $$Tv = F1(\sigma1, F2(\sigma2 \ldots Fn(\sigma n) \ldots ))$$

The coordinate transformation method ensures the reduction in the computational capacity by an order of magnitude as compared to direct matrix multiplication for every leaf of the octree.

It should be mentioned that the aforementioned BVO multiple-scale nature enables the direct selection of a particular BVO multiple-scale level in proportion to the desired detail level of the 3D model represented as BVO, and the distance from the model to the viewer.

A method for representation of an animated 3D object is performed as follows. Original data of each 3D object in a sequence of 3D objects is transformed into BVO format. For each 3D animation frame, six depth images are constructed, corresponding to projections of the object onto cube faces. Thus, video streams, one for each cube face, are generated, as well as six depth maps per frame. For each frame, BVO format is constructed in the byte stream form, as explained above. Video streams are compressed with the aid of any effective compression method like MPEG2. As shown in FIG. 8, BVO animation sequence 30 consists of a sequence 31 of BVO byte streams corresponding to changing geometry of the animated object, and the aforementioned six video streams 32 (sequences of reference images for each frame of animation).

A method of visualization of an animated 3D object is illustrated in the flowchart in FIG. 9. At step 33, data of six reference images and data of the byte stream formed as described above are extracted from the animation sequence. At step 34, the six images are decompressed and BVO structure is constructed. At step 35, the obtained six reference image streams are projected on the BVO to determine color for each BVO vertex. At step 36, decision is taken whether to visualize the decompressed BVO. If affirmative, the BVO corresponding to the animated object frame is visualized at step 37. At step 38, decision is taken whether it is necessary to read the next frame. If affirmative, the process goes to step 33, otherwise the process goes to step 39 and returns to visualization step 37 if the viewpoint changes.

Experiments show that volume of a single BVO format frame obtained by the method in accordance with the invention is from 4 to 10 times smaller than that of the closest prior art orthogonal LDI format. BVO rendering speed, for reference and output image 256-by-256 resolution, is about 20 fps at Pentium Celeron 500 MHz computer (without using hardware-based acceleration, at fixed scale level), this being 2–3 times greater that the rendering speed in the prior art methods which also do not resort to hardware-based acceleration.

What is claimed is:

1. A method for representation and rendering of a three-dimensional object, comprising the steps of:
   converting original data of a three-dimensional object into Binary Volumetric Octree (BVO) format, where color is attributed to each BVO vertex corresponding to coordinates of points belonging to object surface, said color being the average of colors of object surface points whose coordinates are inside a cube representing a three-dimensional image element, voxel, corresponding to given BVO vertex; and
   rendering the BVO by hierarchical traversal of the octree from root vertex to leaves, said rendering including obtaining local three-dimensional coordinates of centers of voxels corresponding to BVO leaves, transforming the obtained three-dimensional coordinates into two-dimensional coordinates of the voxel center and information of size of the projected voxel image, and generating and displaying, for each BVO leaf, a corresponding splat covering the projected voxel image area and using color information, the three-dimensional object being visualized by a plurality of the displayed splats.

2. The method according to claim 1, wherein said original data of a three-dimensional object is a set of depth images, or polygonal model data, or a set of colored points.

3. The method according to claim 2, wherein said hierarchical traversal of the octree is performed in order from BVO voxels farthermost from a viewer to closer BVO voxels.

4. The method according to claim 2, wherein before said traversal of the octree said method comprises computing:

$$fT(i, \sigma i) = T2i - 1\sigma i$$

where T is 4×4 matrix of coordinate type transformation,
   σi is any four-dimensional vector whose elements are 0 or 1,
   i is an integer taking a value from 0 to the height of the BVO being analyzed, and using the obtained results in hierarchical transformation of three-dimensional coordinates into two-dimensional coordinates, while computing Fi for each BVO vertex:

$$F_i = \sum_{j=i}^{n} f_T(i, \sigma^j) = f_T(i, \sigma^j) = F_{i+1} = F_i(\sigma^j, F_{i+1})$$

which gives, after traversal of the entire path from BVO root vertex to leaves, for every BVO leaf specified by local coordinates (x,y,z):

$$Tv = F1(\sigma 1, F2(\sigma 2 \ldots Fn(\sigma n) \ldots))$$

where σi is determined by the expression using binary record of coordinates:

$$v = \begin{pmatrix} x \\ y \\ z \\ 1 \end{pmatrix} = \begin{pmatrix} (\sigma_x^n \ldots \sigma_x^2 \sigma_x^1) \\ (\sigma_y^n \ldots \sigma_y^2 \sigma_y^1) \\ (\sigma_z^n \ldots \sigma_z^2 \sigma_z^1) \\ (0 \ldots 01) \end{pmatrix} = \sum_{i=1}^{n} 2^{i-1} \sigma^i.$$

5. The method according to claim 1, wherein said hierarchical traversal of the octree is performed in order from BVO voxels farthermost from a viewer to closer BVO voxels.

6. The method according to claim 5, wherein before said traversal of the octree said method comprises computing:

$$fT(i, \sigma i) = T2i - 1\sigma i$$

where T is 4×4 matrix of coordinate type transformation,
   σi is any four-dimensional vector whose elements are 0 or 1,
   i is an integer taking a value from 0 to the height of the BVO being analyzed, and using the obtained results in hierarchical transformation of three-dimensional coordinates into two-dimensional coordinates, while computing Fi for each BVO vertex:

$$F_i = \sum_{j=i}^{n} f_T(i, \sigma^j) = f_T(i, \sigma^j) = F_{i+1} = F_i(\sigma^j, F_{i+1})$$

which gives, after traversal of the entire path from BVO root vertex to leaves, for every BVO leaf specified by local coordinates (x,y,z):

$$Tv = F1(\sigma 1, F2(\sigma 2 \ldots Fn(\sigma n) \ldots))$$

where σi is determined by the expression using binary record of coordinates:

$$v = \begin{pmatrix} x \\ y \\ z \\ 1 \end{pmatrix} = \begin{pmatrix} (\sigma_x^n \ldots \sigma_x^2 \sigma_x^1) \\ (\sigma_y^n \ldots \sigma_y^2 \sigma_y^1) \\ (\sigma_z^n \ldots \sigma_z^2 \sigma_z^1) \\ (0 \ldots 01) \end{pmatrix} = \sum_{i=1}^{n} 2^{i-1} \sigma^j.$$

7. The method according to claim 1, wherein before said traversal of the octree said method comprises computing:

$$fT(i, \sigma i) = T2i - 1\sigma i$$

where T is 4×4 matrix of coordinate type transformation,
   σi is any four-dimensional vector whose elements are 0 or 1,
   i is an integer taking a value from 0 to the height of the BVO being analyzed, and using the obtained results in hierarchical transformation of three-dimensional coordinates into two-dimensional coordinates, while computing Fi for each BVO vertex:

$$F_i = \sum_{j=i}^{n} f_T(i, \sigma^j) = f_T(i, \sigma^j) = F_{i+1} = F_i(\sigma^j, F_{i+1})$$

which gives, after traversal of the entire path from BVO root vertex to leaves, for every BVO leaf specified by local coordinates (x,y,z):

$$Tv = F1(\sigma 1, F2(\sigma 2 \ldots Fn(\sigma n) \ldots))$$

where σi is determined by the expression using binary record of coordinates:

$$v = \begin{pmatrix} x \\ y \\ z \\ 1 \end{pmatrix} = \begin{pmatrix} (\sigma_x^n \ldots \sigma_x^2 \sigma_x^1) \\ (\sigma_y^n \ldots \sigma_y^2 \sigma_y^1) \\ (\sigma_z^n \ldots \sigma_z^2 \sigma_z^1) \\ (0 \ldots 01) \end{pmatrix} = \sum_{i=1}^{n} 2^{i-1} \sigma^i.$$

8. A three-dimension object representation and rendering apparatus, comprising:

three-dimensional object original data generation means for generating original data of a three-dimensional object;

three-dimensional object original data conversion means for converting original data of the three-dimensional object into Binary Volumetric Octree (BVO) format, said three-dimensional object original data conversion means being connected to the three-dimensional object original data generation means, where color is attributed to each BVO vertex corresponding to coordinates of object points, said color being the average of colors of the object points whose coordinates are inside a cube representing a three-dimensional image element, voxel, corresponding to given BVO vertex; and BVO rendering means connected to said three-dimensional object original data conversion means.

9. The apparatus according to claim 8, wherein said three-dimensional object original data generation means is a three-dimensional real-life object scanner for outputting a plurality of three-dimensional coordinates of points.

10. The apparatus according to claim 8, wherein said three-dimensional object original data generation means is three-dimensional object polygonal model generation means.

11. The apparatus according to claim 8, wherein said three-dimensional object original data generation means is depth image generation means.

12. A method for representation of an animated three-dimensional object, comprising the steps of:

converting original data of each three-dimensional object in a sequence of three-dimensional objects into Binary Volumetric Octree (BVO) format, where color is attributed to each BVO vertex corresponding to coordinates of points belonging to object surface, said color being the average of colors of object surface points whose coordinates are inside a cube representing a three-dimensional image element, voxel, corresponding to given BVO vertex, so that to generate, for the sequence of three-dimensional objects, a sequence of BVOs corresponding to the animated three-dimensional object.

13. The method according to claim 12, further comprising projecting each BVO in the sequence of BVOs onto faces of a cube corresponding to BVO root vertex, so that to obtain for each cube face a video stream corresponding to animated object images, and generate an octree byte stream, each byte in said octree byte stream corresponding to an octree vertex, and each bit in byte indicating the presence or absence, respectively, of a subtree for said octree vertex, where six video streams and the octree byte stream form together representations of the animated 3D object.

14. The method according to claim 13, further comprising storing said six video streams in compact form in MPEG video compression format, and storing said octree byte stream in entropy compression format.

15. A method for visualizing an animated three-dimensional object represented by a method in accordance with claim 14, including decompressing video data and projecting six reference image streams on BVO to determine color for each BVO vertex and project the colored BVO for visualizing the animated three-dimensional object.

16. A method for visualizing an animated three-dimensional object represented by a method in accordance with claim 13, including decompressing video data and projecting six reference image streams on BVO to determine color for each BVO vertex and project the colored BVO for visualizing the animated three-dimensional object.

17. A method for representation of an animated three-dimensional object, comprising the steps of:

converting original data of each three-dimensional object in a sequence of three-dimensional objects into Binary Volumetric Octree (BVO) format, where color is attributed to each BVO vertex corresponding to coordinates of points belonging to object surface, said color being the average of colors of object surface points whose coordinates are inside a cube representing a three-dimensional image element, voxel, corresponding to given BVO vertex, so that to generate for the sequence of three-dimensional objects a sequence of BVOs corresponding to the animated three-dimensional object;

projecting each BVO in the sequence of BVOs onto faces of a cube corresponding to root vertex of the BVO, so that to obtain for each cube face a video stream corresponding to images of the animated object, and generate an octree byte stream, each byte in said octree byte stream corresponding to an octree vertex, and each bit in byte indicating the presence or absence, respectively, of a subtree for the octree vertex, where six video streams and the octree byte stream form together representations of the animated three-dimensional object.

18. The method according to claim 17, further comprising storing said six video streams in compact form in MPEG video compression format, and storing the octree byte stream in entropy compression format.

19. A method for visualizing an animated three-dimensional object represented by a method in accordance with claim 18, including decompressing video data and projecting six reference image streams on BVO to determine color for each BVO vertex and project the colored BVO for visualizing the animated 3D object.

20. A method for visualizing an animated three-dimensional object represented by a method in accordance with claim 16, including decompressing video data and projecting six reference image streams on BVO to determine color for each BVO vertex and project the colored BVO for visualizing the animated 3D object.

* * * * *